June 6, 1933.  T. N. PIERSON  1,913,040

CHAIN TIGHTENER

Filed Aug. 3, 1931

INVENTOR.
Torvald N. Pierson.

BY
Arthur C. Brown
ATTORNEY.

Patented June 6, 1933

1,913,040

UNITED STATES PATENT OFFICE

TORVALD N. PIERSON, OF INDEPENDENCE, MISSOURI, ASSIGNOR, BY MESNE ASSIGNMENTS, TO GLEANER HARVESTER CORPORATION, OF INDEPENDENCE, MISSOURI, A CORPORATION OF DELAWARE

CHAIN TIGHTENER

Application filed August 3, 1931. Serial No. 554,619.

This invention relates to chain drive mechanisms and more particularly to sprocket supports and means for tightening chains running on the sprockets.

The principal objects of this invention are to employ leverage for tightening a chain, and to shift the bearings of a chain-supporting shaft for tightening a chain.

Other objects of the invention will be apparent in the course of the following description of one form of apparatus embodying the invention and illustrated in the accompanying drawing, wherein.

Figure 1:
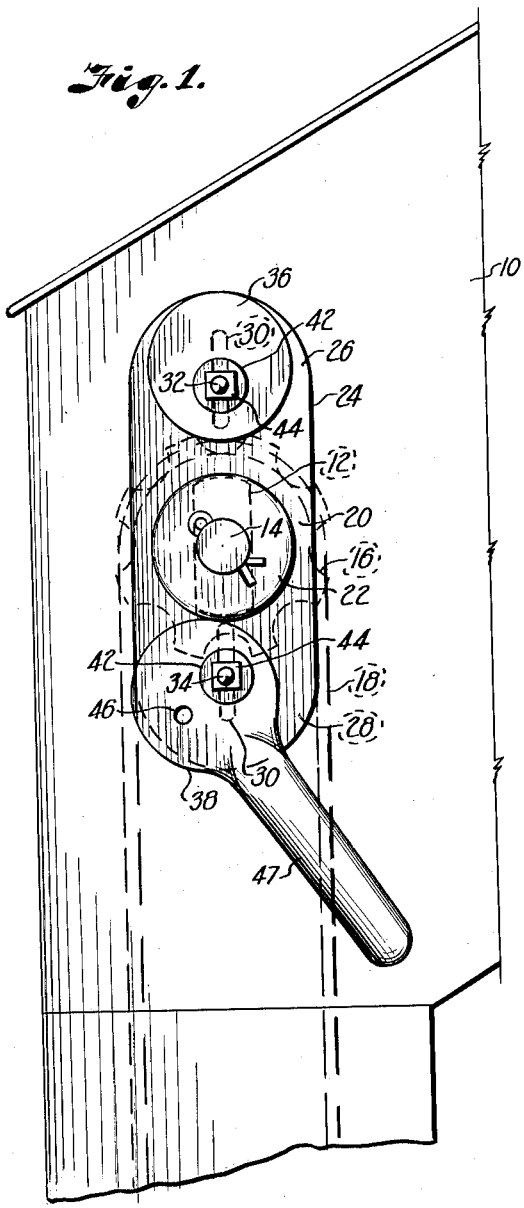
Fig. 1 is a side elevation of a portion of a shaft-supporting casing wall and chain-tightening means embodying this invention, a chain, a sprocket, the edges of a slot in the wall, and portions of a slotted bearing plate being shown in dotted lines.
Figure 2:
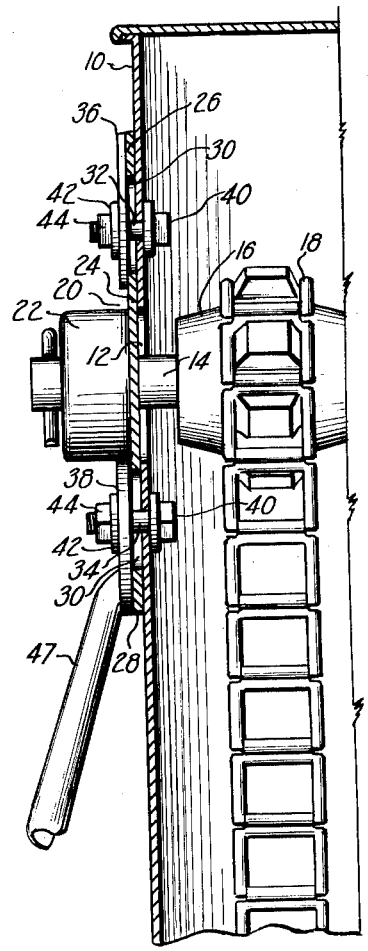
Fig. 2 is a fragmentary view of the casing showing the bearing, clamping disks, and lever in elevation and showing the casing wall and bearing plate in section.
Figure 3:
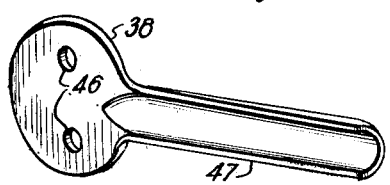
Fig. 3 is a perspective view of the operating disk and lever.

Referring more in detail to the drawing:

10 designates a shaft support comprising in the structure illustrated one of the side walls of a casing having an elongated opening or slot 12 through which one end of a shaft 14 extends.

The opposite end of the shaft projects similarly through an opening in the opposite casing wall (not shown), and one or more sprockets 16 keyed to the shaft carry one or more chains 18 whereby the shaft 14 may operate or be operated by devices (not shown) engaged with the chains.

In order to adjustably support the shaft 14 for varying the tension of the chain, and particularly to tighten the chain, journal bearings such as 20 including hubs 22 are mounted on the outer ends of the shaft, and plates 24 fixed to the bodies slidably engage the outer faces of the casing walls and are adjustably secured thereto by clamping members presently described. The shaft ends extend rotatably through the plates and hubs, and may be retained rotatably in the bearings by any suitable means such as cotter pins exterior to the hubs. Since the supports, shaft ends and adjusting devices are duplicates of each other, only one of each is shown and described.

The plate 24 extends laterally substantial distances on both sides of the wall opening and is elongated to form end portions 26 and 28 extending substantial distances longitudinally from the ends of the wall opening. The end portions are provided with elongated slots 30 for accommodating fastening devices including supports 32 and 34 and clamping plates or disks 36 and 38 that engage the outer face of the plate 24 around the respective slots.

The supports 32 and 34 may comprise bolts as shown, mounted in openings in the wall aligned on the axis of the wall opening 12 and anchored by heads 40 overlying the inner face of the wall. The bolts project through the slots and beyond the plate 24 to provide outer end portions on which the disks 36 and 38 may be slidably and rotatively mounted.

Washers 42 and nuts 44 respectively slidable and threaded on the bolts provide means for urging the disks into engagement with the plate for clamping the bearing to the wall and retaining the shaft end in adjusted position in the wall opening 12 for maintaining desired tension on the chain. The disk 38 is provided with a plurality of openings 46 offset from the center thereof and adjacent its periphery, for eccentrically mounting the disk on the bolt 34, and the disk is located so that its periphery will engage the exterior surface of the bearing body whereby rotation of the disk in clockwise direction in Fig. 1, will cause the cam face thereof to act on the bearing for moving the shaft to tighten the chain. Rotation of the disk in the opposite direction will permit the shaft to be moved oppositely for shortening the chain path and relieving tension on the chain.

A lever 47 extends radially and in an outwardly inclined position from the disk, and is preferably integral therewith, to provide manually operable means for rotating the disk. The inner end of the lever is inbent and fixed to the outer face of the disk adjacent the periphery thereof, and forms a boss on the disk to space the lever materially from the plate 24 and facilitate operation of the disk.

The slots 30 preferably have equal length, and are relatively narrow and preferably have only sufficient width to permit the plate to slide freely over the bolts.

The disks are designed to cover the slots 30 and have suitable dimensions for doing so, and may be relatively small in comparison with the length of the paths of the slots that they cover. A small disk 38 may cover its slot because of the movement of the long arm of the disk in the same direction as the movement of the slotted end of the plate.

In order to permit use of a small disk on the opposite side of the bearing, the disk 36 is also eccentrically mounted, and when the fasteners are loosened, may be rotated to cause the long side thereof to extend in one or the other direction for covering its slot.

The provision of two openings in the operating disk 38 permits right or left hand mounting of an operating disk on a supporting bolt, in accordance with the structure of the supports at one or the other side of a casing, to cause the lever to extend in the most convenient position for operation.

In using the invention the shaft will be positioned to suitably tension the chain, and the disks will be urged against the bearing plate to clamp the plate to the casing wall and support the bearing in fixed selected position. Should the chain require tightening, the nuts on the bolts may be loosened to release the disks and plate, and the cam disk may be rotated to move the bearing the necessary distance for effecting the tightening operation. The nuts may then be operated to fasten the disk to the plate and the plate to the wall. The fasteners may be loosened, and the operating disk turned reversely, to permit the shaft to be adjusted in the other direction.

The lever provides several advantages, including means for operating the adjusting cam disk, and means for supporting the shaft end when the clamping nuts are loosened to permit the bearing plate to slide along the wall.

What I claim and desire to secure by Letters Patent is:

1. In apparatus of the character described including a casing having slotted opposite walls and a shaft provided with a sprocket and having opposite ends located in the slots of said walls, elongated plates slidable over said walls and having aligned spaced slots and bearing openings for the shaft, bearings on the ends of said shaft fixed to said plates, bolts mounted in the casing walls at opposite ends of the slots therein and projecting through the slots of said plates, and clamping members movably eccentrically mounted on said bolts to engage the plates for clamping the plates to the casing walls and including a member having a periphery engaging one of said bearings for shifting the adjacent end of the shaft in one of the slots of the casing walls, and a handle on said disk for rotating the same to shift the shaft end.

2. In apparatus of the character described including a wall provided with an elongated opening, and a shaft having one end located in said opening, a bearing on said end of the shaft having a plate slidable over said wall and provided with aligned slots on opposite sides of said opening, clamp supports mounted on said casing wall and projecting through said slots, and clamp members movable on said supports toward and from said bearing for clamping the bearing to the wall and including a cam face on one of the clamping members engaging the bearing for shifting the shaft end in the wall opening, and means for operating the cam.

3. In apparatus of the character described including a wall provided with an elongated opening, and a shaft having one end located in said opening, a bearing on said end of the shaft having a plate slidable over said wall and provided with aligned slots on opposite sides of said opening, clamp supports mounted on said casing wall and projecting through said slots, and clamp members movable on said supports toward and from said bearing for clamping the bearing to the wall and including a disk engaging the bearing for shifting the shaft end in the wall opening and having a radially extending handle and a plurality of openings offset from the center of said disk for selectively mounting the disk eccentrically on the support therefor to cause the handle to extend in a selected direction from the support.

4. In apparatus of the character described including a casing having a wall provided with an elongated opening, a shaft having one end located in said opening, and a flexible transmission member on the shaft under stress tending to shift the shaft in one direction in the wall opening, a bearing on said end of the shaft including a body portion and a plate slidable over said casing wall and provided with a slot located adjacent one end of the wall opening, movable means for securing the upper end of the plate to the wall, a support mounted on the casing wall below the opening therein and projecting outwardly through said slot, a disk eccentrically slidably mounted on said support to engage the plate for clamping said end of the plate to the casing wall and having a periphery engaging said bearing for shifting the end of the shaft in the wall opening, a boss on the outer face of the disk adjacent the periphery thereof, and a handle extending from said boss outwardly from the disk for rotating the disk to shift the shaft.

5. In apparatus of the character described including a shaft, supporting means for the shaft including a wall having a slot through which one end of the shaft is projected and having spaced apertures located in alignment with the slot, a bearing rotatably supporting said end of the shaft, a plate carrying the bearing and slidable over the wall in covering relation with said slot and having slots in registering alignment with said apertures, fastening devices extending through said apertures and slots forming guides for said plate, and clamp members mounted on said fastening devices and covering said slots in the plate for clamping the plate to the wall, one of said clamp members forming a cam engaging the bearing for shifting the bearing on the wall.

6. In apparatus of the character described including a support provided with a slot and spaced apertures aligning with the slot, a bearing for supporting a shaft in the slot, a plate carrying the bearing and slidably engaging the support and having slots registering with said apertures, fastening means extending through the slots in the bearing plate and through said apertures, disk members eccentrically mounted on said fastening devices and covering said slots in the plate for clamping the plate to the support, one of said disk members having a cam face for effecting shifting of said plate, and means for rotating said disk member.

In testimony whereof I affix my signature.

TORVALD N. PIERSON.